Figure 1:
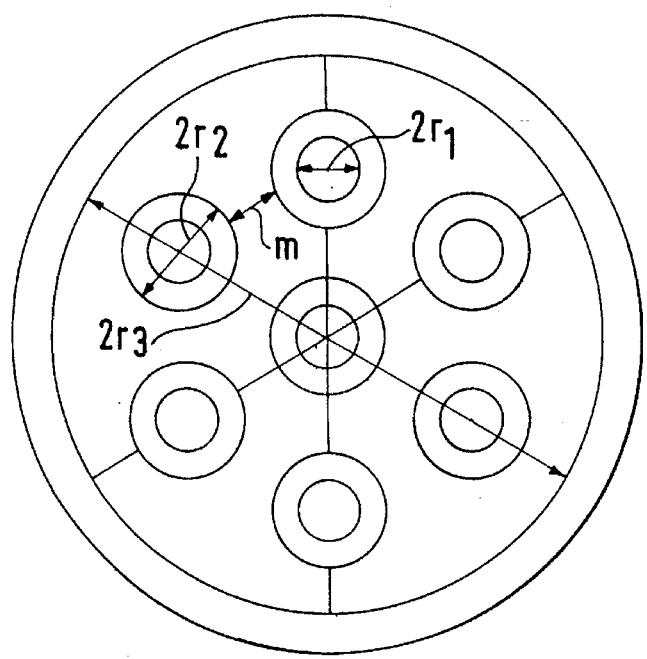

United States Patent
Stiehl et al.

Patent Number: 5,569,437
Date of Patent: Oct. 29, 1996

[54] OZONE GENERATING APPARATUS

[75] Inventors: Hans-Henrich Stiehl; Jurgen Schweckendiek; Herbert Bestandig, all of Berlin, Germany

[73] Assignee: Sorbios Verfahrenstechnische Gerate und Systeme GmbH, Germany

[21] Appl. No.: 369,715

[22] Filed: Jan. 6, 1995

[30] Foreign Application Priority Data

Jan. 7, 1994 [DE] Germany .................. 44 00 517.2

[51] Int. Cl.⁶ .................................................. B01J 19/08
[52] U.S. Cl. .................. 422/186.07; 422/186.11; 422/186.18; 422/186.19; 422/907
[58] Field of Search .................. 422/186.07, 186.11, 422/186.18, 186.19, 907

[56] References Cited

U.S. PATENT DOCUMENTS

| | | | |
|---|---|---|---|
| 4,878,149 | 10/1989 | Stiehl et al. | 361/230 |
| 4,985,213 | 1/1991 | Ooe et al. | 422/186.01 |
| 5,009,858 | 4/1991 | Mechtersheimer | 422/186.19 |
| 5,019,355 | 5/1991 | Sackinger | 422/186.04 |
| 5,034,198 | 7/1991 | Kaiga et al. | 422/186.07 |
| 5,258,165 | 11/1993 | Olsen | 422/186.18 |
| 5,364,600 | 11/1994 | Stiehl et al. | 422/186.07 |
| 5,435,978 | 7/1995 | Yokomi | 422/186.07 |
| 5,437,843 | 8/1995 | Kuan | 422/186.07 |

FOREIGN PATENT DOCUMENTS 3731168  3/1989  Germany .

*Primary Examiner*—Charles T. Jordan
*Assistant Examiner*—Daniel Jenkins
*Attorney, Agent, or Firm*—Young & Basile, P.C.

[57] ABSTRACT

An apparatus for generating ozone with at least one ceramic tube forming a dielectric, a discharge electrode associated with the ceramic tube and connected to a high voltage supply and a counter-electrode is proposed, in which the at least one ceramic tube is cooled by a coolant and an oxygen-containing gas is passed into the vicinity of the discharge tube. The at least one ceramic tube (1) is inserted in a ceramic moulding (2) by means of oxidic glass or ceramic solders and an encasing tube (6) embraces the at least one ceramic tube (1) and is sealed against the ceramic mouldings (2).

15 Claims, 2 Drawing Sheets

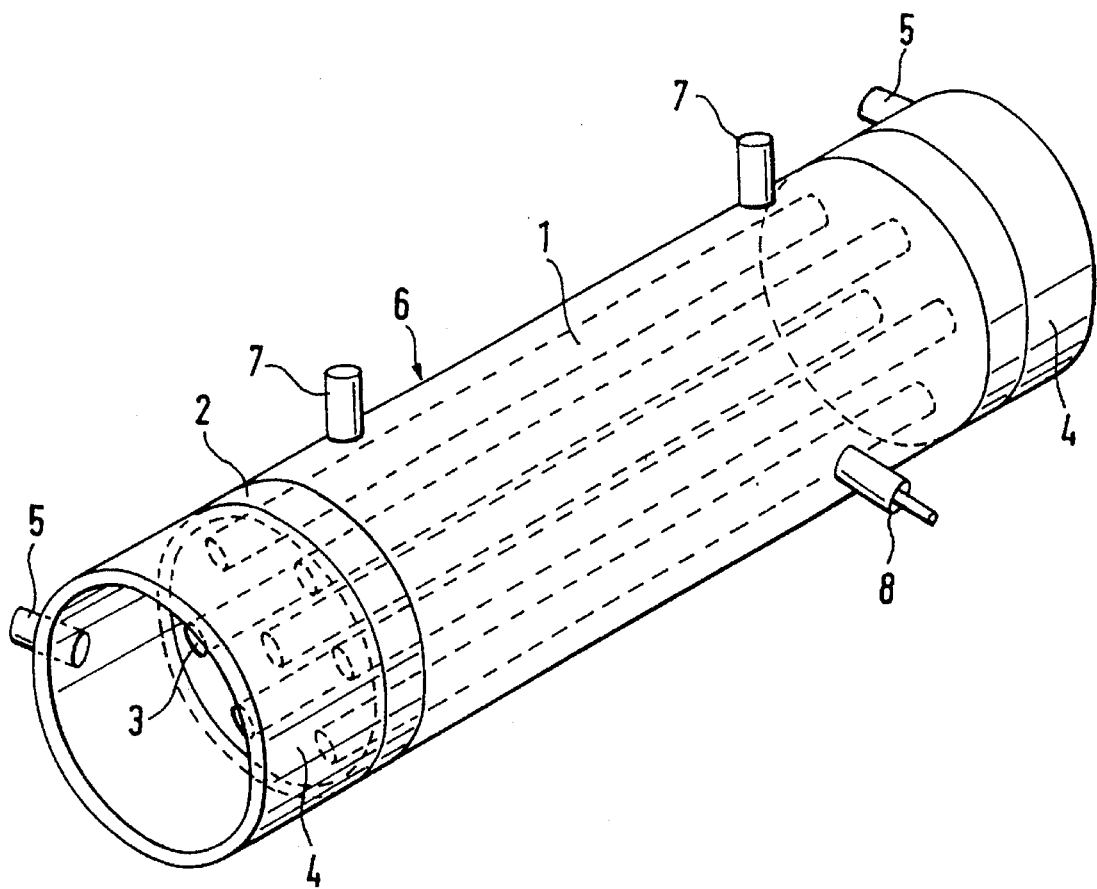

OZONE GENERATING APPARATUS

The invention relates to an apparatus for generating ozone according to the preamble of the main claim.

Ozone generators which, in accordance with the principle of the silent electric discharge, generate ozone from an oxygen-containing gas have long been known. The conventional arrangement comprises two electrodes, which are generally separated by a dielectric. Between at least one of the electrodes and the dielectric is provided a gas gap through which is passed the oxygen-containing gas. An a.c. voltage impressed from the outside on the electrode is increased to such an extent that a discharge occurs between the dielectric and at least one of the electrodes. In the discharge oxygen molecules are split off and atomic oxygen is formed. Ozone is generated through the reaction of atomic oxygen with molecular oxygen.

The possibility of building high-performance ozone generators is determined in that part of the electrical energy, which is transformed into heat, can be rapidly and reliably removed from the discharge area. Inter alia, in conventional ozone generators the gas gap is reduced for this purpose. For the heat transfer to the cooling medium the gas gap is generally the "speed-determining stage". In the technical manufacture of ozone generators there are limits resulting from the maintaining of manufacturing tolerances. Thus, in the manufacture of tubular ozone generators (Welsbach type) at least two tubes must be kept with a uniform spacing over the entire length. Over the last few years ozone generators have become known (DE 3,731,168), in which at least one electrode is applied directly to the dielectric, so that the dielectric directly becomes the boundary medium between the gas zone and the coolant zone. The gas zone which is exposed to the discharge is in the immediate vicinity of the dielectric, which is surrounded by the cooling medium. The discharge leading to ozone formation can be referred to as a surface discharge. In this case the gas-carrying tube acts as a dielectric and is made from ceramic.

An important disadvantage of such known arrangements is that for obtaining a suitable cooling the ceramic tubes must be mechanically connected to the cooling system (generally water) and the gas guidance means. Technically successful ozone generators can be manufactured by a carefully designed system of mechanical screw couplings and elastic seals. However, mechanical seals are complicated and expensive to manufacture and form.

The manufacture of ceramic tubes with sufficiently small tolerances in order to be able to mechanically screw down the ceramic tubes makes high demands on the manufacturing procedure or the finishing of the ceramic. In special applications, e.g. for the manufacture of ozone generators for semiconductor production, increased demands are also made on the leakproofing and particle production. These requirements can only be achieved with high effort and expenditure when using mechanical screw couplings and elastic sealing elements.

In the known ozone generators the gas-carrying ceramic tube is always surrounded by an annular clearance through which the cooling medium is passed in order to obtain a uniform cooling with a high wall velocity (advantageous heat transfer).

It would be simpler to combine several discharge tubes in a common, surrounding encasing tube in the manner of a tubular heat exchanger. However, this is prevented by the spacing of the individual tubes being defined by their mechanical screw couplings and sealing elements. As a result of this forced spacing for each individual discharge tube there is a "covolume" in the heat exchanger, which has a negative effect on the intensity of the cooling if it is "excessive". The covolume will be defined hereinafter. In order to obtain a good cooling in this case it is either necessary to greatly increase the cooling water volume flow, in order to obtain a comparable average wall velocity (heat transfer) to that when there is a bounding annular clearance and in this case the specific cooling water consumption S (necessary cooling water flow ($m^3/h$) based on the ozone production (g/h) obtained) is high, so that technical values are at 1.5 to 5 $m^3$/kg. Or there is a through-flow with a predetermined cooling water requirement ($m^3$/kg), based on the ozone production and in an arrangement of several discharge tubes in a common encasing tube the wall velocity is low and therefore the heat transfer is less favourable than in the annular clearance system.

The problem of the invention is to provide an ozone generating apparatus, which provides a compact arrangement and ensures good cooling.

According to the invention this problem is solved by the characterizing features of the main claim in conjunction with the features of the preamble.

Due to the fact that the dielectric of the apparatus for the ceramic tubes used for ozone generation is in each case inserted in a ceramic moulding by means of oxidic glass or ceramic solders and that an encasing tube embraces the ceramic tubes and is sealed against the ceramic mouldings, a compact arrangement for the ozone generating apparatus is obtained. It is possible to achieve a much better utilization of the common cooling water volume, if the ceramic tubes are fixed in tightly juxtaposed manner by the soldering process in the mouldings serving as gas distribution plates and in the soldering process temperatures between 300° and 1500° C. are used.

The apparatus according to the invention leads to high packing densities and the corresponding covolumes in a tube bundle-like construction are e.g. 50 to 60·$10^{-6}$ $m^3$ instead of approximately 250·$10^{-6}$ $m^3$ when using mechanical screw couplings (cf. FIG. 1 in Table 1).

As a result of the use of such oxidic solders it is possible to obtain leakage rates below $10^{-9}$ mbar·l/s, which e.g. meets the requirements for ozone use in semiconductor technology.

The choice of the solders also influences the metallic impurities obtained with a corresponding arrangement. In the case of ozone generators used in semiconductor manufacture it is also necessary to avoid trace impurities with heavy metals. Through the choice of the solders according to the invention in which no critical heavy metals are used, such impurities can be avoided in the gas passing out of the ozone generator or can be reduced to a few ppb and less.

If solders are used which during a second soldering operation have a higher melting point than during the first, in the case of a corresponding design of the apparatus it is possible to solder in a number of stages soldered joints having different orientations. Correspondingly varyingly complex degrees of a solder-joined arrangement can be produced.

Embodiments of the invention are described in greater detail hereinafter relative to the drawings, wherein show:

FIG. 1 a cross-section through a ceramic moulding in the form of a perforated plate for illustrating the dimensions in the description and in Table 1.

Figure 2:
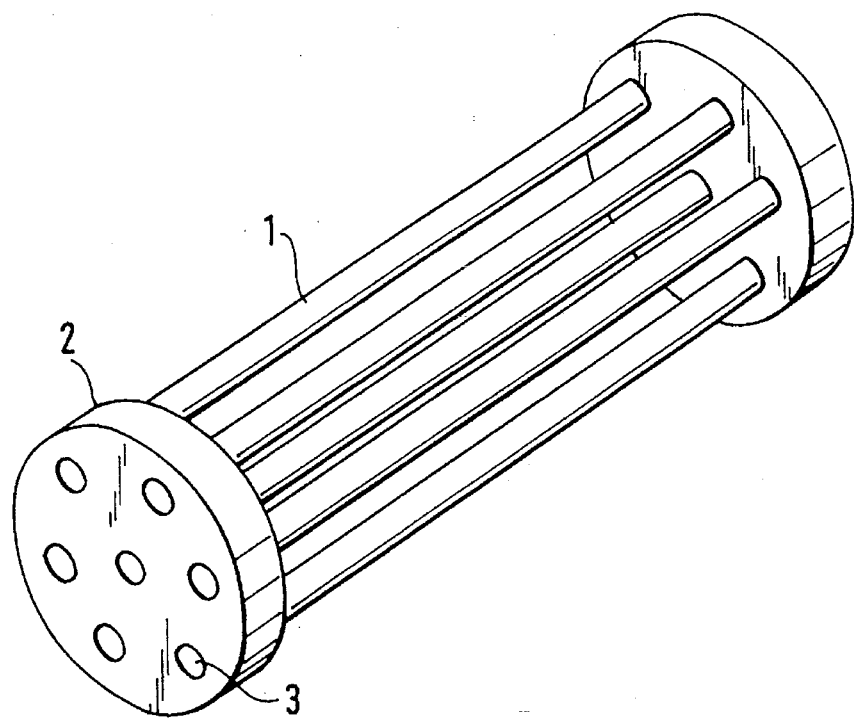

FIG. 2 a partial representation of the apparatus according to the invention in perspective view in a first embodiment.

FIG. 3 a view of the embodiment of the apparatus according to FIG. 2.

In the basic construction according to FIG. 2 a plurality of individual ceramic tubes 1 of the ozone generator are joined to ceramic perforated plates 2, the junction taking place on the one hand positively and on the other by soldering the junction points with an oxidic glass or ceramic solder at temperatures between 300° and 1500° C.

FIG. 1 shows a cross-section through the ceramic perforated plate 2 for illustrating the dimensions given hereinafter. Table 1 is a survey of the geometrical data of the cooling for an embodiment with tubular ozone generating elements with seven tubes and mechanical screw couplings and ceramic joined by soldering and in which:

r1 is the outside radius of the dielectric tube 1, r2 is the radius when using mechanical screw couplings, m is an additional spacing, which is e.g. provided for tools or for the necessary "meat" between two holes, r3 is the radius obtained as the minimum inside radius for a common encasing tube.

Table 1 also gives the cross-sectional surface of the encasing tube ($\pi r_3^2$) the sum of the cross-sectional surfaces of the individual tubes ($\pi r_1^2$) and the free cross-section, together with the "covolume" per 1 m tube length, in which the free cross-section and covolume are defined as:

free cross-section=$\pi(r_3^2 - n\ r_1^2)$, n is the number of discharge tubes, covolume=free cross-section×length of tubes.

The table shows that the "covolume" of an arrangement of e.g. seven ceramic tubes when using mechanical screw couplings is roughly five times as great as in an arrangement according to the invention joined with ceramic.

FIG. 2 shows the basic construction usable in different embodiments. A preferred embodiment is shown in FIG. 3, in which the plurality of ceramic tubes 1 is surrounded by a common, ceramic encasing tube 6, which is joined by soldering to the perforated plates 2. In the preferred embodiment the not shown discharge electrodes of the ceramic tubes forming the dielectric are so helically inserted in the tubes 1, that the helical electrodes press against the inner faces of the ceramic tubes 1. In this case the gas is passed through the openings 3 of the ceramic tubes 1 and along the latter and between the helical electrodes and the corresponding dielectric there is a silent discharge. In the encasing tube 6 are inserted by means of solder water connections 7 and the introduced and removed water flows round the ceramic tubes 1. As can be seen in FIG. 3, to the perforated plate 2 is fitted a hollow cylinder, which is also made from ceramic and can be connected in one piece to the perforated plate. However, it can also be joined by solder by a soldered joint from a perforated plate and a ceramic hollow cylinder. The hollow cylinder 4 forms a gas distribution zone into which issue the openings of the ceramic tubes. Gas connections 5 are soldered into the hollow cylinder 4. On one side are inserted electrode connections 8 for the supply of high voltage and optionally the potential for the counterelectrode, once again using the same joining technology. By means of electrically conductive connections the externally applied voltage is distributed over the individual discharge tubes in the gas zone. The hollow cylinder 4 is closed by a cover, which is also soldered or sealed by means of O-rings.

In the embodiment according to FIG. 3 all the connections and joining points are connected by oxidic glass or ceramic solder. However, as a function of the intended use and the desired construction, modified embodiments can be used.

In the basic construction only the individual ceramic tubes 1 are connected to the ceramic perforated plates 2 which separate the gas zone from the coolant zone. For the reception of the O-ring packings the perforated plates can be peripherally slotted, so that the encasing tube, which is provided with a supply and drain for the cooling medium, can be peripherally sealed on both sides. Obviously other possibilities are also conceivable for the purpose of sealing the encasing tube in watertight and pressure loadable manner, e.g. by adhesive joints. In this embodiment there is no need for the seal to be subject to ozone action. The seal between the gas zone and the coolant is provided by the described soldered joint.

The ceramic mouldings in which are inserted the ceramic tubes and which are used for gas distribution purposes, can be provided with holes in such a way that there is a symmetrization of the gas flows in the individual tubes. For example, the holes or bores can be constructed as nozzles.

If the encasing tube for the cooling water definition is produced from an electrically conductive material, when using a conductive cooling medium it can itself serve as the counterelectrode for the individual discharge tubes. However, it is additionally possible to provide electrically conductive connections between the individual tubes and the encasing tube.

If the cooling water limitation encasing tube is made from an insulating material, an electrode passage through said tube and optionally further electrically conductive connections to the individual tubes may be necessary.

In the embodiment according to FIG. 3 the gas zone is formed by the ceramic perforated plate 2 and a second tube section closed on one side and which are soldered together. The material for the tube section closed on one side can be constituted by conductive and insulating, ozone-resistant materials corresponding to the case of the encasing tube for the coolant zone. If conductive materials are used, e.g. high-grade steel, due to the proximity to high voltage necessary for the electrical discharge, higher demands are made on the insulation intervals and creep distances. However, as a result the apparatus becomes less compact. This disadvantage is avoided through the use of insulating materials, but here again sealing elements such as elastomer O-rings reduce the compactness.

In the described embodiment a helical discharge electrode is used in the dielectric. It is obviously also possible to use an internal high voltage electrode passed centrally through the ceramic tube and a discharge takes place in the gas gap between the central discharge electrode and the ceramic tube as the dielectric.

In another embodiment the discharge electrode can be placed live externally on the ceramic tube, but then in an arrangement according to FIG. 3 there is a reversal between the coolant zone and the gas-carrying zones, i.e. the gas zone is then located between the encasing tube and the ceramic tubes, whereas the coolant is passed through the ceramic tubes.

The apparatus according to the invention has the advantage of the non-burnability of the ceramic components used and the joining points. They are also non-corrodible and even when using high-alloyed steels in conjunction with high purity oxygen or if ozone generation by-products occur (moisture, nitrogen oxide compounds) such a corrosion process cannot always be excluded.

TABLE 1

Survey of the geometrical data of the cooling for an embodiment with tubular ozone generating elements with seven tubes, a) with mechanical screw couplings, b) with ceramic joined by soldering.

| Dimensions corresponding to FIG. 1 | Mechanical screw couplings | Ceramic, joined by soldering. |
| --- | --- | --- |
| $r_1$: outside tube radius of individual discharge tubes (m) | 4.00E – 03 | 4.00E – 03 |
| $r_2$: outside radius of the mechanical screw couplings | 7.00E – 03 | 0.00E + 00 |
| m: minimum spacing for "meat" or assembly devices | 3.00E – 03 | 2.00E – 03 |
| T: division min. $2 \cdot r_2 + m$ | 17.0E – 03 | 10.0E – 03 |
| $r_3$: min. inside radius for common encasing tube: $r_3 = 3 \cdot T/2$ in the case of 7 tubes corresponding to FIG. 1 (m) | 25.5E – 03 | 15.0E – 03 |
| Cross-sectional surface of encasing tube (m$^2$) | 2.04E – 03 | 706.9E – 06 |
| Sum of cross-sectional surfaces of individual tubes (m$^2$) | 351.9E – 06 | 351.9E – 06 |
| Free cross-section (m$^2$) | 1.69E – 03 | 355.0E – 06 |
| Covolume per 1 m tube length and individual tube (m$^3$) | 241.6E – 06 | 50.7E – 06 |

We claim:

1. An apparatus for generating ozone comprising at least one ceramic tube forming a dielectric, a discharge electrode associated with the ceramic tube and connected to a high voltage supply and a counterelectrode, wherein at least one ceramic tube is cooled with a coolant and an oxygen-containing gas is passed proximate to the discharge electrode, the at least one ceramic tube is inserted in a ceramic molding and joined thereto with one of oxidic glass and ceramic solder and an encasing tube is embraced to the at least one ceramic tube and is sealed against the ceramic moldings.

2. The apparatus according to claim 1, wherein a plurality of dielectric-forming ceramic tubes are inserted in the moldings for forming a tube bundle.

3. The apparatus according to claim 1, wherein the encasing tube is made from ceramic and joined to the moldings by one of the oxidic glass and ceramic solder.

4. The apparatus according to claim 1, wherein the encasing tube is sealed with a seal, such as an O-ring packing against the moldings.

5. The apparatus according to claim 1, wherein the discharge electrodes are located within the ceramic tubes and engage helically on the inner wall thereof, and a space between the encasing tube and the ceramic tubes forms a coolant zone and connections for the supply and discharge of the coolant provided in the encasing tube.

6. The apparatus according to claim 1, wherein the discharge electrodes engage on the circumferential surface of the ceramic tubes, a space between the encasing tube and the ceramic tubes forming a gas discharge zone and connections provided in the encasing tube for the supply and discharge of the gas.

7. The apparatus according to claim 1, wherein the molding is constructed as a perforated plate.

8. The apparatus according to claim 1 wherein the molding has a cavity into which issue the ceramic tubes and the molding is provided at least one connection for one of gas and coolant therein.

9. The apparatus according to claim 8, wherein the molding is constructed as a perforated plate with a fitted closed hollow cylinder.

10. The apparatus according to claim 8, wherein the molding has at least one electrode connection.

11. The apparatus according to claim 10, wherein at least one of the coolant connection and the gas connections and the electrode connections is soldered by means of one of the glass and ceramic solder into at least one of the encasing tube and the moldings.

12. The apparatus according to claim 11, wherein at least one of the coolant connections and the gas connections and the electrode connections is soldered by means of one of glass and ceramic solder at temperatures between 300° and 1500° C.

13. The apparatus according to claim 1, wherein one of the glass and ceramic solder has two melting points, the melting point at a second soldered joint being higher than that at the first.

14. The apparatus according to claim 1, wherein the ceramic moldings are provided with holes in such a way that there is a symmetrization of the gas flows in the individual tubes.

15. The apparatus according to claim 14, wherein the holes form a nozzle construction.

\* \* \* \* \*